US006838665B2

(12) United States Patent
Kato

(10) Patent No.: US 6,838,665 B2
(45) Date of Patent: Jan. 4, 2005

(54) ION TRAP TYPE MASS SPECTROMETER

(75) Inventor: Yoshiaki Kato, Mito (JP)

(73) Assignee: Hitachi High-Technologies Corporation, Tokyo (JP)

( * ) Notice: Subject to any disclaimer, the term of this patent is extended or adjusted under 35 U.S.C. 154(b) by 0 days.

(21) Appl. No.: 10/351,446

(22) Filed: Jan. 27, 2003

(65) Prior Publication Data

US 2004/0061050 A1 Apr. 1, 2004

Related U.S. Application Data

(63) Continuation of application No. 10/239,764, filed on Sep. 26, 2002, now Pat. No. 6,787,767.

(51) Int. Cl.[7] .......................... H01J 49/42; H01J 49/00; B01D 59/44

(52) U.S. Cl. ....................... 250/292; 250/291; 250/281; 250/282

(58) Field of Search ................................ 250/281–283, 250/292, 293, 299, 300, 291

(56) References Cited

U.S. PATENT DOCUMENTS

| | | | | | |
|---|---|---|---|---|---|
| 2,939,952 | A | | 6/1960 | Paul et al. | |
| 4,540,884 | A | | 9/1985 | Stafford et al. | |
| 4,882,484 | A | * | 11/1989 | Franzen et al. | 250/282 |
| 5,171,991 | A | * | 12/1992 | Johnson et al. | 250/292 |
| 5,198,665 | A | * | 3/1993 | Wells | 250/282 |
| 5,200,613 | A | * | 4/1993 | Kelley | 250/282 |
| 5,206,507 | A | * | 4/1993 | Kelley | 250/282 |
| 5,352,890 | A | * | 10/1994 | Johnson et al. | 250/282 |
| 5,386,113 | A | * | 1/1995 | Franzen et al. | 250/292 |
| 5,451,782 | A | * | 9/1995 | Kelley | 250/282 |
| 5,466,931 | A | | 11/1995 | Kelley | |
| 6,114,691 | A | * | 9/2000 | Cousins | 250/282 |
| 6,166,378 | A | | 12/2000 | Thomson et al. | |
| 2003/0085349 | A1 | * | 5/2003 | Kato | 250/292 |
| 2003/0150989 | A1 | * | 8/2003 | Yoshinari et al. | 250/292 |
| 2004/0061050 | A1 | * | 4/2004 | Kato | 250/292 |
| 2004/0159785 | A1 | * | 8/2004 | Kato | 250/292 |

OTHER PUBLICATIONS

Y. Umemura, Japanese Patent Application #JP 2001210268 A, publication date Aug. 3, 2001.*

Y. Kato, Japanese Patent Application #JP 2001159622 A, publication date Jun. 6, 2001.*

Yoshinari et al., Japanese Patent Application #JP 11120956 A, publication date Apr. 30, 1999.*

Yoshinari et al., Japanese Patent Application #JP 08287866 A, publication date Nov. 01, 1996.*

YYoshinari et al., Japanese Patent Application #JP 2001167729 A, publication date Jun. 22, 2001.*

* cited by examiner

*Primary Examiner*—John R. Lee
*Assistant Examiner*—Bernard E. Souw
(74) *Attorney, Agent, or Firm*—Dickstein Shapiro Morin & Oshinsky LLP

(57) ABSTRACT

A method of discriminating singly-charged ions from multiply-charged ions using an inexpensive ion trap type mass spectrometer is provided. A mass-analyzing method using an ion trap type mass spectrometer equipped with a ring electrode and one pair of end cap electrodes temporarily traps ions in a three-dimensional quadropole field to mass-analyze a sample. The method comprises applying a main high frequency voltage to the ring electrode forming a three-dimensional quadropole field; generating ions in the mass analyzing unit or injecting ions from the outside and trapping the ions of a predetermined mass-to-charge ratio in the mass analyzing unit; applying a supplementary AC voltage having a plurality of frequency components between the end cap electrodes and scanning the frequency components of the supplementary AC voltage; and scanning a main high frequency voltage and ejecting ions from the mass analyzing unit and detecting thereof. With this, chemical noises can be reduced dramatically.

5 Claims, 15 Drawing Sheets

ION TRAP TYPE MASS SPECTROMETER

This application is a continuation application of Ser. No. 10/239,764, filed Sep. 26, 2002 now U.S. Pat. No. 6,787, 767.

FIELD OF THE INVENTION

The invention relates to an ion trap type mass spectrometer and a mass analyzing method thereof.

BACKGROUND OF THE INVENTION

A mass spectrometer is a highly sensitive and highly precise instrument that can directly mass-analyze a sample and has been widely used in various fields from astrophysics field to bio-technology field.

There are various kinds of mass spectrometers based on different principles of measurement. Among such mass spectrometers, ion trap type mass spectrometers have rapidly become popular because of their compactness and a variety of functions. The original ion trap type mass spectrometer was invented by Dr. Paul in the 1950s. It is disclosed in U.S. Pat. No. 2,939,952. After that, a lot of researchers have improved devices and techniques. For example, a fundamental technique of obtaining mass spectra by an ion trap type mass spectrometer is disclosed in U.S. Pat. No. 4,540,884. Further, U.S. Pat. No. 4,736,101 discloses a mass spectrometry method of applying a supplementary AC voltage and ejecting and detecting ions in resonance. Furthermore, U.S. Pat. No. 5,466,931 discloses a mass spectrometry method of freely ejecting and dissociating ions in an ion trap using that a supplementary AC voltage comprises a plurality of frequency components (noise having a broad frequency spectrum) instead of a single frequency component. This technology uses a resonance of ion secular frequencies and supplementary AC voltages and can eject a lot of ions in resonance at a time. As the purpose of the wide-band noise signal of the invention is to eject ions of a wide range simultaneously, the noises are at an identical voltage. However, the frequency component corresponding to the frequency of an ion to be stored in the ion trap is notched. The ions corresponding to the notch frequency are steadily stored in the ion trap without causing resonance.

In recent years, various ionization methods for chemical analysis such as matrix-assisted laser desorption/ionization (MALDI) and electrospray ionization (ESI) have been developed. This has also enabled mass analysis of biomolecules such as proteins and DNAs. Particularly, to electrospray ionization (ESI) method can directly extract stable gaseous ions from a solution of biomolecules which are apt to be decomposed by heat.

In ESI, biomolecules such as proteins, peptides which are digestive decomposition of protein, and DNAs produces multiply-charged ions. A multiply-charged ion has two or more charges (n) per molecule (m). As the mass spectrometer (MS) mass-analyzes ions by the mass-to-charge (m/z) ratio, the MS handles an ion of molecular weight m having n charges as an ion of a mass-to-charge value m/n. For example, the mass-to-charge (m/z) ratio of protein of molecular weight 30,000 having 30 charges is 1,000 (=30, 000/30) and the protein can be mass-analyzed as a singly-charged ion of molecular weight 1,000. Therefore this technology has enabled even a small mass spectrometer such as a quadrupole mass spectrometer (QMS) and an ion trap type mass spectrometer to easily mass-analyze proteins whose molecular weight is over 10,000.

For mass-analysis of a very small amount of components in blood or biological tissue, it is required to remove a lot of interface components (impurities) or to clean up before the mass-analysis.

This clean-up requires lots of time and man-power. However, it is impossible to remove all impurities even by a complicated pre-processing. These impurities disturb the signals of the components of the biological sample. This obstruction is called a chemical noise. To remove or separate such impurities, a liquid chromatography-mass spectrometer (LC/MS) has been developed which comprises a combination of a liquid chromatography (LC) and a mass spectrometer placed before the LC. FIG. 25 shows the schematic diagram of a conventional LC/MS. The mobile phase 32 (a sample solution) of the LC is pumped into an analysis column 35 through an injection port 34 by a pump 33. The analysis column 35 separates impurities from the sample solution (biological sample components) and sends the sample solution to the ESI ion source 36 on-line. The sample solution eluted from the LC is introduced into a spray capillary 37 to which a high voltage is applied in the ESI ion source 36. The sample solution is sprayed from the tip of the capillary 37 into the atmosphere in the ESI ion source 36 to be fine charged droplets (–μm). The fine charged droplets collide with atmospheric molecules in the ESI ion source 36 and are mechanically pulverized into smaller droplets. This collision and pulverization step is repeated until ions are finally ejected into atmosphere. This is the process of electrospray ionization (ESI). The ions are introduced into a mass spectrometer 40 through an intermediate pressure chamber 38 and a high-vacuum chamber 39 which are vacuumed by vacuum pumps 30 and 31 and mass-analyzed there. The result of analysis is given as a mass spectrum by a data processor 41.

The high-sensitivity analysis of extremely trace biological components in blood or tissue cannot be attained easily even by means of pre-processing, cleaning up, and a liquid chromatography (LC). This is because the quantity of a sample to be mass-analyzed is extremely small ($10^{-12}$ gram or less) and the overwhelming majority of the sample consists of interferences which cannot be fully separated or removed even by preprocessing or the liquid chromatography (LC).

As one of means for solving such problems, U.S. Pat. No. 6,166,378 presents a try to discriminating target components from such interferences components in mass-analysis. Most of interferences in a biological sample are lipids, carbohydrates, and so on whose molecular weight is comparatively low (1,000 or less). These low-molecular-weight components interfere, on the mass spectrum, with bimolecules such as proteins, peptides, and DNAs whose molecular weight is 2,000 or more. This is because the biomolecules give multiply-charged ions and mass peaks appear in a low mass region. In the ESI technology, most of interferences whose molecular weight is comparatively low produce singly-charged ions. Contrarily, most of biomolecules such as proteins and peptides produce multiply-charged ions by the ESI.

Singly-charged ions can be distinguished from multiply-charged ions by accelerating these ions together at a pressure of about 1 torr. By this acceleration, ions repeatedly collide with gas molecules. In this case, if the proton affinity (PA) of the gas molecule is greater than that of the ions, a proton is deprived of the ion and as the result, the ion loses one charge. The multiply-charged ions are apt to cause this ion-molecule reaction and easily transfer protons to neutral molecules such as water. Contrarily, as the ions have fewer charges, this ion-molecule reaction occurs comparatively less. In other words, singly-charged ions are hard to lose charges but multiply-charged ions are apt to lose charges.

U.S. Pat. No. 6,166,378 uses this difference in the ion-molecule reaction and a tandem mass spectrometer which combines three mass spectrometers in tandem to identify mass signals on mass spectrum.

DISCLOSURE OF THE INVENTION

The try to use a tandem mass spectrometer to distinguish singly-charged ions from multiply-charged ions has various problems. One of the problems is that only small part of ions introduced into the tandem mass spectrometer reaches the detector. In other words, the transmission efficiency of ions of the tandem mass spectrometer is very low (–%). Therefore, the measuring sensitivity of tandem mass spectrometer is much lower than the measuring sensitivity that is required by the mass-analysis of biomolecular compounds. Another problem is that the discrimination of singly-charged and multiply-charged ions, that is, the cooperating sweeping of the first and third mass spectrometers (MSs) in tandem can be done only once for one mass spectrum. Therefore, the filtering effect of the signal-to-noise is limited. Furthermore, this technique requires three mass spectrometers in tandem, which makes the system very expensive.

The present invention has been made to solve such problems and it is an object of this invention to provide an improved mass-analyzing method capable of distinguishing singly-charged and multiply-charged ions by an inexpensive ion trap type mass spectrometer In accordance with the above object, there is provided a method of mass analyzing a sample by an ion trap type mass spectrometer which is equipped with a mass analyzing unit having a ring electrode and one pair of end cap electrodes and mass-analyzes by temporarily trapping ions in a three-dimensional quadrupole trapping field. This method comprises a first step of applying a main high frequency voltage to said ring electrode to form a three dimensional quadrupole field, a second step of generating ions in said mass analyzing unit or injecting ions from the outside and trapping ions of a predetermined mass-to-charge ratio range in said mass analyzing unit, a third step of applying a supplementary AC voltage having a plurality of frequency components between said end cap electrodes and scanning the frequency components of said supplementary AC voltage, and a fourth step of scanning said main high frequency voltage and ejecting ions from said mass analyzing unit and detecting thereof.

Further, there is provided a method of mass analyzing a sample by an ion trap type mass spectrometer which is equipped with a mass analyzing unit having a ring electrode and one pair of end cap electrodes and mass-analyzes by temporarily trapping ions in a three-dimensional quadrupole trapping field. This method comprises a first step of applying a main high frequency voltage to said ring electrode to form a three dimensional quadrupole field, a second step of generating ions in said mass analyzing unit or injecting ions from the outside and trapping ions of a predetermined mass-to-charge ratio range in said mass analyzing unit, a third step of applying a supplementary AC voltage having a plurality of frequency components between said end cap electrodes and scanning said main high frequency voltage, and a fourth step of scanning said main high frequency voltage and ejecting ions from said mass analyzing unit and detecting thereof.

BEST MODE TO PUT THE INVENTION TO PRACTICE

Figure 1:
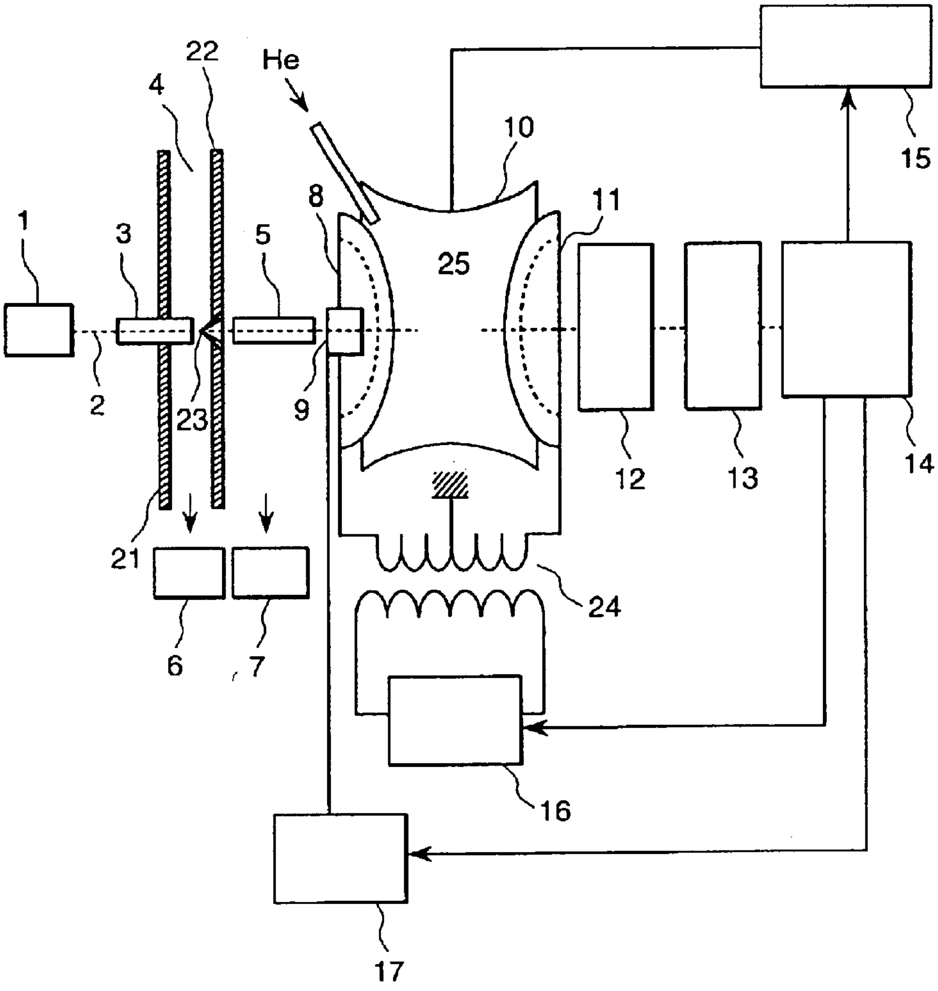
FIG. 1 is a simplified schematic diagram of an apparatus as an embodiment of the present invention.

Referring to FIG. 1 which is a simplified schematic diagram of an apparatus an embodiment of the present invention, a sample solution eluted from the liquid chromatography (LC) is sprayed into the atmosphere in the ESI ion source to be fine charged droplets. The ions which are emitted from the droplets are introduced into an intermediate pressure chamber 4 which is evacuated by a vacuum pump 6 through a heated capillary 3 which is provided in a partition wall 21. The ions are fed to a high-vacuum chamber which is evacuated by a turbo-molecular pump 7 through a skimmer 23 on the partition wall 22. The ions reach the ion gate 9 through a multipole ion guide 5 to which a high frequency is applied. The ion gate 9 works as an electrode to turn on and off ion supply into the ion trap type mass spectrometer.

The ion trap type mass spectrometer consists of one donut-shaped ring electrode 10 and two ends cap electrodes 8 and 11 placed to sandwich thereof. A main high frequency voltage of frequency $\Omega$ is applied to the ring electrode 10. These electrodes form an ion trap volume 25 and a three-dimensional quadrupole field is formed within ion trap volume 25. Further, a supplementary AC voltage in opposite phase is applied to the two end cap electrodes 8 and 11 from a supplementary AC source via a coil 24 and a dipole field is formed together with the quadrupole field in the trap volume. The ions generated in or introduced into the ion trap volume 25 are steadily trapped within the quadrupole field.

The ions trapped within the quadrupole field are ejected sequentially in the order of masses from the ion trap volume 25 by sweeping the amplitude (voltage) of the main high-frequency voltage and detected by a detector 12. The detected ion current is amplified by a direct current amplifier 13 and sent to a data processor 14. The data processor 14 works to control the main high frequency voltage source 15, the supplementary AC voltage source 16, and the ion gate power source 17 for the ion gate and collect mass spectra.

Figure 24:
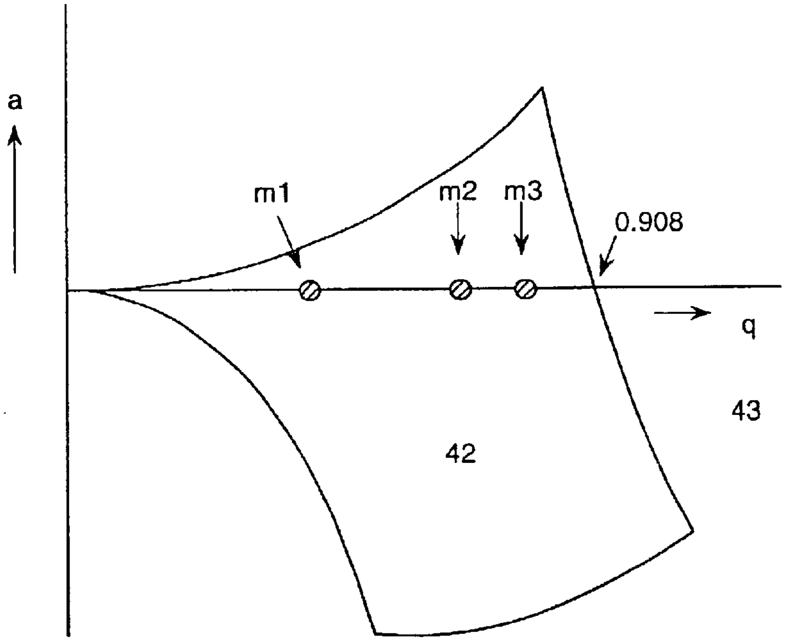
FIG. 24 is a Mathieu stability diagram.
Figure 25:
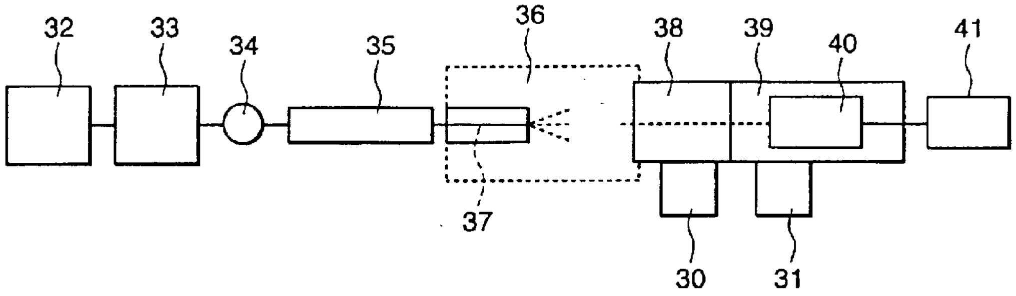
FIG. 25 is a schematic block diagram illustrating the configuration of a typical liquid chromatography (LC)—mass spectrometer (MS) system.

The behavior of ions in the quadrupole field within the ion trap volume is mathematically and graphically expressed as a Mathieu stability diagram as shown in FIG. 24.

The mass (m) of a certain ion is related to the quadrupole field by the expressions (1) and (2) as shown below with the specific values "a" and "b" as two parameters.

$$a_z=-(8eU)/(mr_0^2\Omega^2) \quad (1)$$

$$q_z=(4eV)/(mr_0^2\Omega^2) \quad (2)$$

Where U is a d.c. voltage of the main high frequency voltage; "m" is the mass of the ion; "$r_0$" is the radius of the ion trap; "Ω" is the frequency of the main high frequency voltage; and "V" is a voltage of the main high frequency voltage.

The ions respectively have specific values "a" and "b" according to expressions (1) and (2). If both of these values "a" and "q" are within the region 42 in the Mathieu stability diagram (see FIG. 24), the ions are trapped steadily in the ion trap. On the contrary, the ion value "a," "b," or both are in the region 43 outside the Mathieu stability curve, the ions become unstable, collide with the inner wall of the ion trap, and lose their charges or are emitted out of the ion trap. FIG. 24 also illustrates how ions are trapped without a d.c. component "U" of the main high frequency voltage. As "U" is 0, the ion value "a" is 0 in the expression (1). For ions having masses m1 (greatest), m2, and m3 (smallest), their "q" values are inversely ordered as $q_1$ (smallest), $q_2$, and $q_3$ (greatest) from the expression (2). Therefore, the ions m1, m2, and m3 are positioned from left to right along the "q" axis.

The ions trapped in the ion trap volume keep on oscillating in the ion trap at secular frequencies determined by trapping parameters (V, $r_0$, and Ω) such as their masses and high frequency voltages. This oscillating motion constrains the ions to the orbits determined by their masses and trapping parameters. This motion on the orbit is called a secular motion and the oscillation frequency of the motion is called a secular frequency (ω). This secular frequency (ω) is expressed by $$\omega=\sqrt{\phantom{x}}2eV/mr_0^2\Omega \quad (3)$$

From the above, it is apparent that the secular frequency (ω) of an ion is in proportion to the main high frequency voltage V and in reverse proportion to the mass of the ion. When the secular frequencies of three ions are assumed to be $\omega_1$, $\omega_2$, and $\omega_3$, they are ordered as $\omega_1<\omega_2<\omega_3$ from the expression (3). Ions can have an identical secular frequency when their trapping parameters and masses are the same. On the other hand, ions having different masses oscillate at different secular frequencies.

When the secular frequency of an ion is equal to the frequency of the supplementary AC voltage, the ions resonate with the supplementary AC voltage and get (absorbs) energy from the supplementary AC voltage. This absorbed energy drastically increases the amplitude of the orbit of each ion. If the supplementary AC voltage is a few volts (V) or higher, the ion orbit becomes greater and goes out of the ion trap volume 25. Consequently the ion is ejected from the ion trap.

When the supplementary AC voltage is 1V or lower, the ion is confined within the ion trap but the ion orbit becomes greater by resonance. As the result, it becomes more frequently so that the ions collide with helium gas molecules and residual gas molecules in the ion trap. A method of analyzing the dissociation process of ions (into daughter ions) in this step is called an MS/MS method. The repetitive collision of neutral molecules with ions which have obtained energy by resonance causes not only the dissociation of ions but also an ion-molecule reaction. The proton ($H^+$) exchange reaction is a kind of ion-molecule reaction. In case of collision of multiply-charged ions, we often observe the reaction of proton extraction of ions (a so-called proton extraction reaction).

(Embodiment 1)

Figure 2:
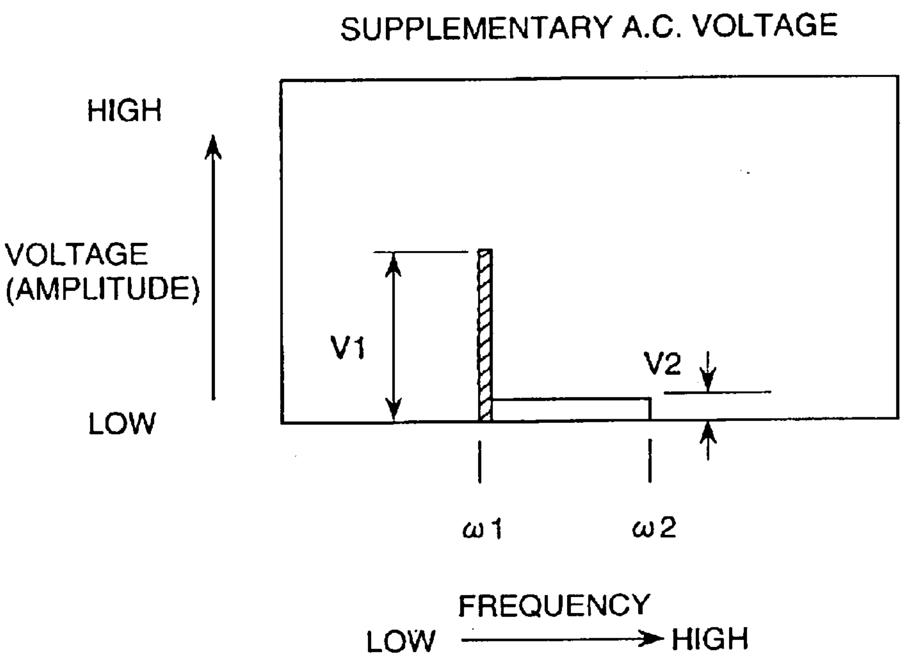
FIG. 2 is an embodiment of a supplementary AC voltage of the present invention.

FIG. 2 is a power spectrum of a supplementary AC voltage used by the present invention. This graph has frequencies on the horizontal axis (x-axis) and voltages on the vertical axis (y-axis). A supplementary AC voltage applied between end caps 8 and 11 comprises a plurality of frequency components; a frequency component of frequency ω1 and voltage V1 and a wide-band noise signal of voltage V2 and frequency components of a wide frequency range (ω1 to ω2). In general, V1 is about 3V and V2 is about 0.2V. The supplementary AC voltage of frequency ω1 is strong enough to allow ions to go out of the ion trap by resonance. The wide-band noise signal of a wide frequency range (ω1 to ω2) works to excite ions and promote the proton extraction reaction. The frequency ω1 is lower than the frequency ω2.

Figure 3:
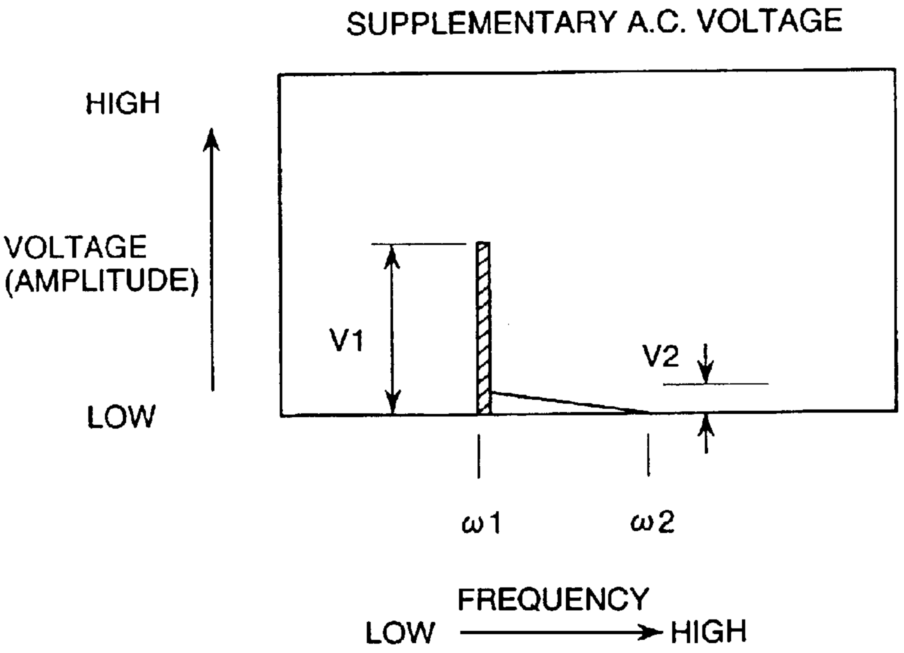
FIG. 3 is an embodiment of a supplementary AC voltage of the present invention.
Figure 4:
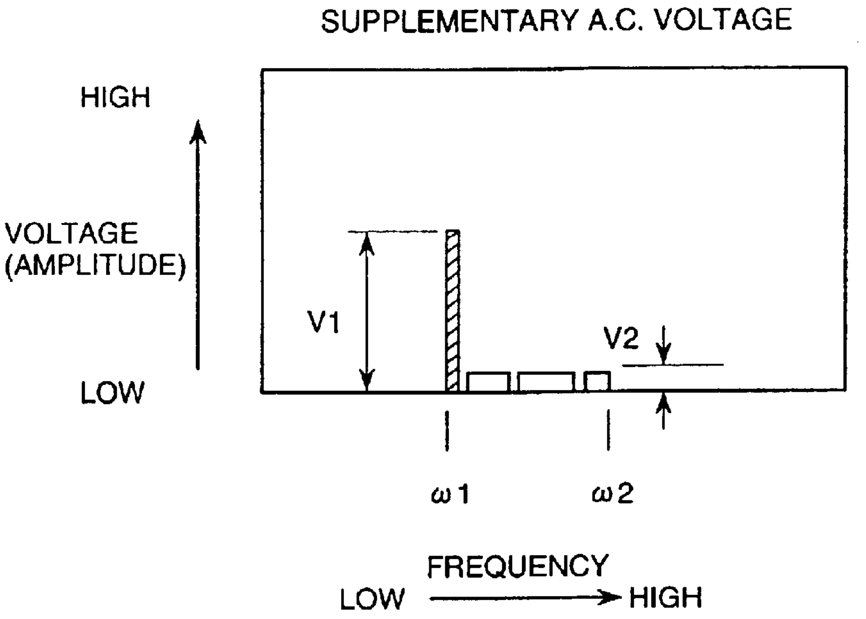
FIG. 4 is an embodiment of a supplementary AC voltage of the present invention.

In FIG. 2, the voltage of the wide-band noise component is constant (0.2V), but it is also possible to apply a noise signal whose voltage is reduced linearly or in a curve from frequency ω1 to frequency ω2 as shown in FIG. 3. Further the wideband noise signal is not always continuous and can be discrete as shown in FIG. 4. Further the signal for ejecting ions has a single frequency component (ω1) in FIG. 2. FIG. 3, and FIG. 4 but can have frequency components of a wide range (ω1 to ω3). Here these three frequencies are ordered as $\omega 1 \leqq \omega 3 < \omega 2$.

Figure 6:
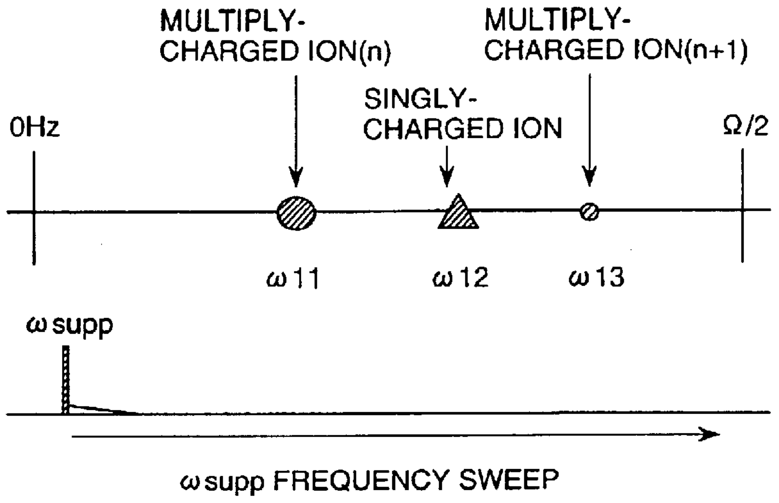
FIG. 6 is an operating diagram of the first embodiment.
Figure 7:
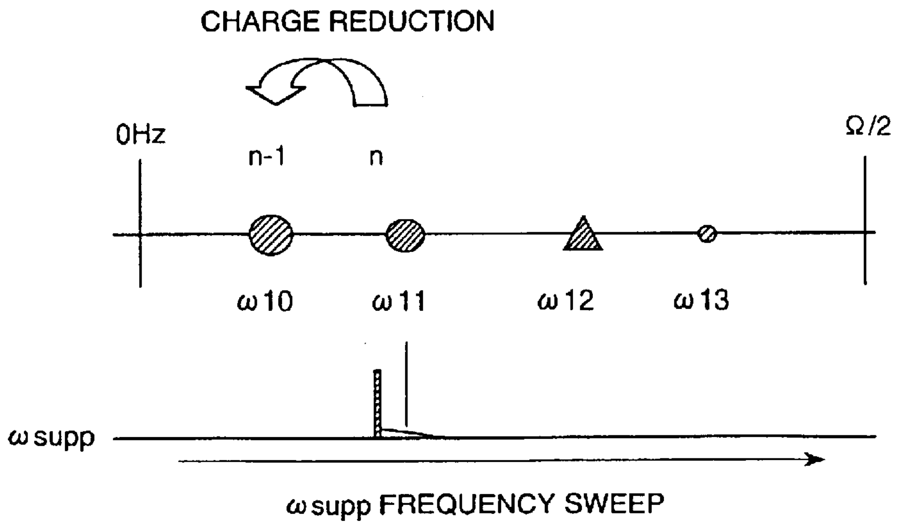
FIG. 7 is an operating diagram of the first embodiment.

Let's assume that the ESI produces multiply-charged ions ("n"-charged and "n+1"-charged) and introduces them into the ion trap volume and that ESI simultaneously produces a singly-charged ions $m_2^+$ and introduces them into the ion trap volume. A supplementary AC voltage of a voltage and frequencies as shown in FIG. 2 is applied between the end cap electrodes 8 and 11 from the supplementary AC voltage source 16. As shown in FIG. 6, initially the frequency ($\omega_{supp}$) of the supplementary AC voltage is set lower than the secular frequency ω11 of "n"-charged ions. Sweeping of the frequency of the supplementary AC voltage from low frequency to high frequency starts without changing the form of the applied supplementary AC voltage (frequency components of ω1 to ω2). As shown in FIG. 7, when the frequency ω2 of the supplementary AC voltage reaches the secular frequency ω11 of the "n"-charged ions (multiply-charged ions of "n" charges), the "n"-charged ions are selectively excited and oscillate wider. However, as the exciting voltage is too low for the orbit of the "n"-charged ions to swell bigger than the ion trap volume, the sweeping of the frequency of the supplementary AC voltage continues. This excitation of the "n"-charged ions continues from frequency ω1 to frequency ω2.

During this sweeping, the "n"-charged ions frequently collide with neutral molecules and are deprived of protons as expressed by Expression (4). Here, the "n"-charged ions is expressed by $(M+nH)^{+n}$. This indicates n protons ($H^+$) are attached to the molecule M of the molecular weight m.

$$(M+nH)^{+n}+S\rightarrow\{M+(n-1)H\}^{+(n-1)}+(S+H)^+ \quad (4)$$

Where "S" is a molecule having a greater proton affinity which exists a little in the ion trap volume. Such molecules are water, methanol, and amines.

As the mass of the "n"-charged ion $(M+nH)^{+n}$ is "m+n," the m/z value of the ion $(M+nH)^{+n}$ is (m+n)/n=m/n+1. The m/z value of a daughter ion $\{M+(n-1)H\}^{+(n-1)}$ produced by the ion-molecule reaction (4) is (m+n−1)/(n−1)=m/(n−1)+1.

In other words, the m/z value changes (from the m/z value of parent ion to the m/z value of daughter ion) before and after the ion-molecule reaction (4), as follows.

$$m/n+1 \rightarrow m/(n-1)+1 \tag{5}$$

The mass difference Δm between parent and daughter ions is calculated by $$\begin{aligned} \Delta m &= \{m/(n-1)+1\} - \{m/n+1\} \\ &= m/(n-1) - m/n \\ &= m/(n-1)\cdot n \end{aligned} \tag{6}$$

Where $$\Delta m > 0 \tag{7}$$

as values "m," "n−1," and "n" are all positive.

Therefore $$\{m/(n-1)+1\} > \{m/n+1\} \tag{8}$$

Judging from the above, it is apparent that the mass-to-charge ratio (m/z) of a "n"-charged ion (parent ion) which is deprived of a proton during excitation changes suddenly and the mass-to-charge ratio (m/z) of the produced daughter ion of "n−1" charges becomes greater than that of the parent ion of "n" charges. Further, as the secular frequency of the ion is inversely proportional to the mass of the ion (see Expression (3)), the secular frequency ω10 of the produced daughter ion of "n−1" charges becomes smaller than the secular frequency ω11 of the parent daughter ion of "n" charges.

$$\omega 10 < \omega 11 \tag{9}$$

As seen in FIG. 7, the daughter ion of "n−1" charges skips over the region of the supplementary AC voltage (ω1) for ejecting ions and the region of the supplementary AC voltage (ω1 to ω2) for weak excitation and enters the high mass region in the Mathieu stability diagram. As the result, the daughter ion will be no longer affected by the supplementary AC voltage.

Figure 8:
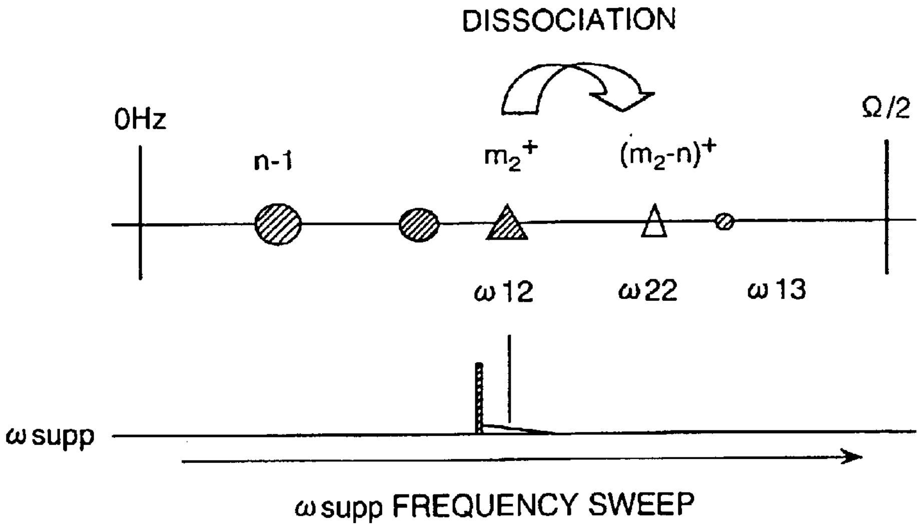
FIG. 8 is an operating diagram of the first embodiment.

When the frequency sweeping of the supplementary AC voltage continues, the frequency ω1 becomes equal to the secular frequency ω12 of a singly-charged ion $m_2$ (see FIG. 8). The singly-charged ion $m_2^+$ is excited, collides with a neutral molecule S in the ion trap, and finally dissociates to produce a daughter ion $(m_2-n)^+$. As the mass-to-charge ratio (m/z) of the daughter ion $(m_2-n)^+$ is smaller than that of the singly-charged ion $m_2$, the ion is apparently shifted rightward on the Mathieu stability diagram (see FIG. 8).

$$m_2^+ + S \rightarrow (m_2-n)^+ + n + s \tag{10}$$

Figure 9:
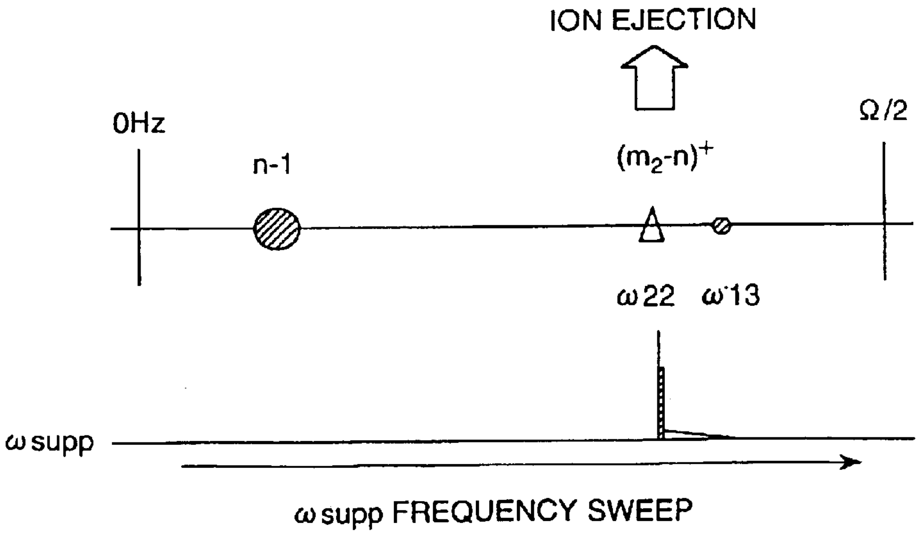
FIG. 9 is an operating diagram of the first embodiment.

When the frequency sweeping of the supplementary AC voltage further continues, ω1 of the supplementary AC voltage becomes equal to the secular frequency ω22 of the above daughter ion $(m_2-n)^+$. Here the daughter ion is excited and may produce second or later generation daughter ions due to collision induced dissociation (CID). Ions which do not dissociate further are excited weakly from ω2 to ω1 and then excited strongly by ω1. Here the singly-charged ion suddenly increase the amplitude of the secular frequency (ω) and are ejected out of the ion trap. In this way, the singly-charged ions are finally driven out of the ion trap (see FIG. 9).

Figure 10:
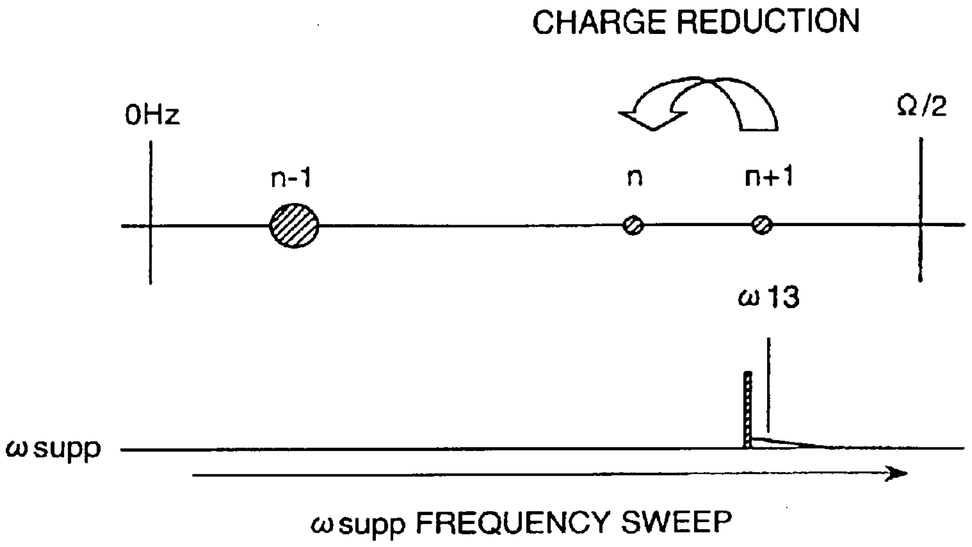
FIG. 10 is an operating diagram of the first embodiment.

When the frequency sweeping of the supplementary AC voltage further continues, ω1 of the supplementary AC voltage reaches the secular frequency ω13 of a multiply-charged ions of "n+1" charges (see FIG. 10). The multiply-charged ions are respectively extracted of one proton by a weak excitation and the number of charges of the multiply-charged ion is reduced by one. In other words, the multiply-charged ion having "n" charges is produced.

This multiply-charged ion also jumps over the supplementary AC voltage region (ω1 to ω3) and enters the left high mass region in the Mathieu stability diagram.

When the supplementary AC voltage is swept on from lower frequency towards higher frequency, ions are exited in the order of heavier ions to lighter ions. The multiply-charged ions lose their charges and jump to a higher m/z region.

Figure 11:
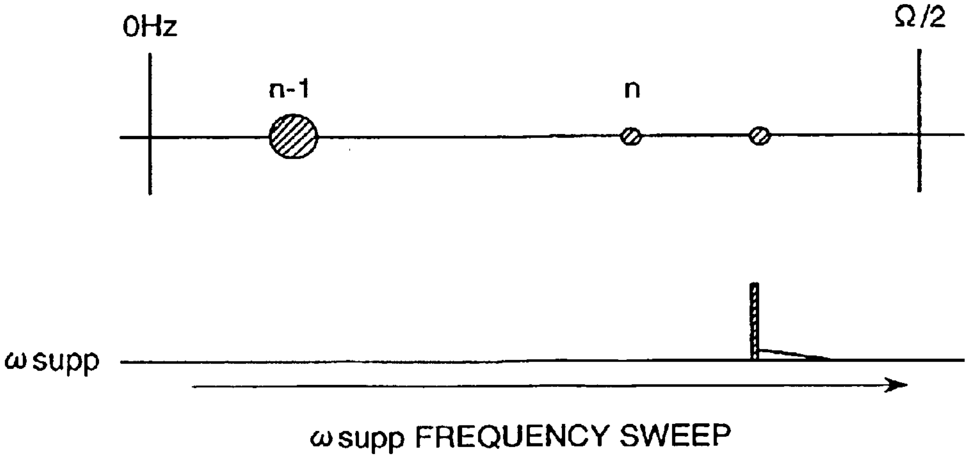
FIG. 11 is an operating diagram of the first embodiment.

Finally, multiply-charged ions are preferentially trapped in the ion trap volume (see FIG. 11).

If the secular frequency of a multiply-charged ion having lost one charge by resonant excitation is between the frequencies ω1 and ω2 of the supplementary AC voltage, the produced ion is excited again by the supplementary AC voltage and may cause an additional proton deprival reaction. To prevent this, the secular frequency ω10 of the produced ion must not be between the frequencies ω1 and ω2. As the secular frequency ω10 is physically determined, the frequencies ω1 and ω2 must be determined so that a relationship of ω10<ω1<ω2 may be satisfied. For this purpose, it is important not to expand the interval between ω1 and ω2 unnecessarily.

Here, the ratio "r" of the range of the wide-band noise signal (ω1 to ω2) to the frequency ω1 of the supplementary AC voltage to be applied is determined as explained below. The secular frequency of an ion to be trapped in the ion trap is inversely proportional to the mass "m" of the ion as expressed by Expression (3). The mass difference between ions before and after the proton extraction reaction is expressed by Expression (6). Let's assume that the secular frequency of a "n"-charged ion of mass "n" is ω11 and the secular frequency of a "n−1"-charged ion which is extracted of one proton is ω10, the ratio "r" is expressed by $$r = (\omega 11 - \omega 10)/\omega 11 = 1 - \omega 10/\omega 11 \tag{11}$$

This expression (11) is further changed as follows:

$$r = 1 - \omega 10/\omega 11 = 1 - (n-1)/n \tag{12}$$

Further, we obtain $$\omega 10/\omega 11 = (n-1)/n \tag{13}$$

In other words, when a multiply-charged ions loses a charge by the proton extraction reaction, the ratio of secular frequencies of the charge-reduced ion to the original ion is a reciprocal number of the ratio of their charges.

From this relationship, it is apparent that when a multiply-charged ion having comparatively more charges is extracted of a proton, the difference between secular frequencies of the multiply-charged ions becomes smaller. For sample, when proteins are mass-analyzed, multiply-charged ions of 10 to 30 charges are frequently observed. Similarly, when peptides are mass-analyzed, multiply-charged ions of 5 or fewer charges are frequently observed. For example, when multiply-charged ions of 29 charges are produced from multiply-charged ions of 30 charges, the ratio "r" is obtained from Expression (12).

$$1 - \omega 10/\omega 11 = 1 - 29/30 = 1/30 \tag{14}$$

The m/z value of the daughter ion is shifted about 3% from the m/z value of the parent ion. To prevent this shift, the interval between ω1 and ω2 of the supplementary AC voltage to be set must be about 3% or less of ω2.

When the frequency of a supplementary AC voltage is swept, it is necessary to strictly make the interval between ω1 and ω2 of the supplementary AC voltage proportional to the frequency. However, it is actually very rare that multiply-charged ions having more than 30 charges are produced even from the ESI of proteins. For the ESI of peptides, multiply-charged ions of 5 to 2 charges are usually observed. Therefore, the subsequent proton extraction reaction can be suppressed when the interval between ω1 and ω2 of the supplementary AC voltage is set to about 3% of the frequency ω of the supplementary AC voltage.

Figure 12:
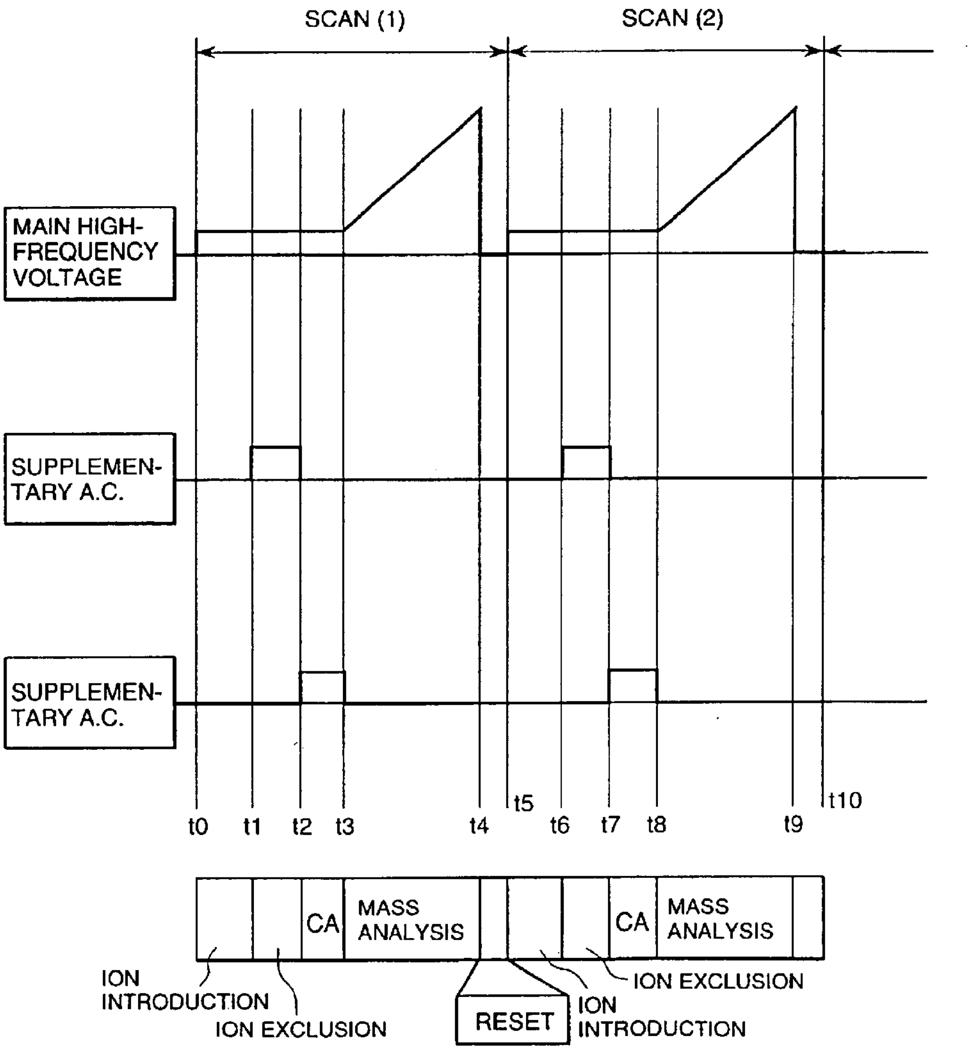
FIG. 12 is a timing diagram illustrating the operation of the first embodiment.

FIG. 12 is a timing diagram illustrating the operation of this embodiment.

In the mass-analysis by the ion trap, the mode of measurement changes in sequence as the measurement proceeds.

(1) Ionization Step ($t_0$ to $t_1$, $t_5$ to $t_6$, . . . )

A voltage of −200V is applied to the ion gate 9 from the ion gate power source 17 and ions are introduced into the ion trap volume 25.

In this case, a low voltage is set as the main high frequency voltage. By this low voltage, ions of a wide mass range are trapped in the ion trap volume 25. In this status, the ions of sample component and ions of most of chemical noise are equally trapped there.

(2) Exclusion of Ions of a Predetermined Mass Range ($t_1$ to $t_2$, $t_6$ to $t_7$, . . . )

When the ion introduction time ends at $t_1$, a voltage of +200V is applied to the ion gate 9 to prevent positive ions from entering the ion trap volume. Next, a wide-band noise is applied as a supplementary AC voltage. The wide-band noise contains continuous frequency components from 1 KHz to ω1. The supplementary AC voltage can be about 3 to 10 V. When this wide-band noise is applied to the end cap electrodes, ions of mass "m1" or more that have secular frequencies less than a secular frequency ω1 are excited in resonance with the supplementary AC voltage together and are all driven out of the ion trap. Contrarily, ions of mass "m1" or less are trapped in the ion trap.

(3) Sweeping the Frequency of the Supplementary AC Voltage ($t_2$ to $t_3$, $t_7$ to $t_8$, . . . )

Next, a supplementary AC voltage containing any one of noise components of FIG. 2 to FIG. 5 is applied. Here, the secular frequency (ω) of the in-trap ion of the maximum mass is assumed to be ω11 and the secular frequency of the in-trap ion of the minimum mass is assumed to be ω13. Now, a supplementary AC voltage comprising of a supplementary AC voltage having a frequency ω1 and an amplitude of a few volts and a noise signal having a voltage of about 0.2V and frequency components ω1 to ω2 is applied between the end cap electrodes. The frequency sweeping of the supplementary AC starts from a lower frequency towards the higher frequency without changing the form of the supplementary AC. Ions are excited in resonance in the order of ions of higher mass to ions of low mass. The ions in resonance increase the amplitude of oscillation and frequently collide with gas molecules in the ion trap volume. In this process, part of charges of the multiply-charged ion transfers to the gas molecules and consequently, the multiply-charged ions reduces the number of charges.

Meanwhile, singly-charged ions of one charge or adduct ions are dissociated into daughter ions (fragment ions) of lower mass by collision excitation which is induced by excitation. If the singly-charged ions neither dissociate nor lose any charge by the collision excitation, the mass-to-charge ratio (m/z) of the ions remains constant.

When the frequency ω1 of the supplementary AC voltage for ejecting ions becomes equal to the secular frequency of the ions, the ions start to resonate and go out of the ion trap. The daughter ions which are fragment ions are excited in resonance again by sweeping of the main high-frequency voltage, resonate with the supplementary AC voltage for ejecting ions, and are driven out of the ion trap.

Finally, multiply-charged ions are preferentially trapped in the ion trap volume. Hereinafter, this process is called "multiply-charged ion filtering".

(4) Mass Analysis ($t_3$ to $t_4$, $t_8$ to $t_9$, . . . )

When the ion excitation time is over, the supplementary AC voltage is turned off. Then, sweeping of the main high-frequency voltage starts by a command from the data processor 14. Ions ejected in the order of masses are detected by the detector 12. The detected ion current is sent to the data processor 14 through a direct-current amplifier and turned into a mass spectrum.

(5) Resetting ($t_4$ to $t_5$, $t_8$ to $t_9$, . . . )

Figure 13:
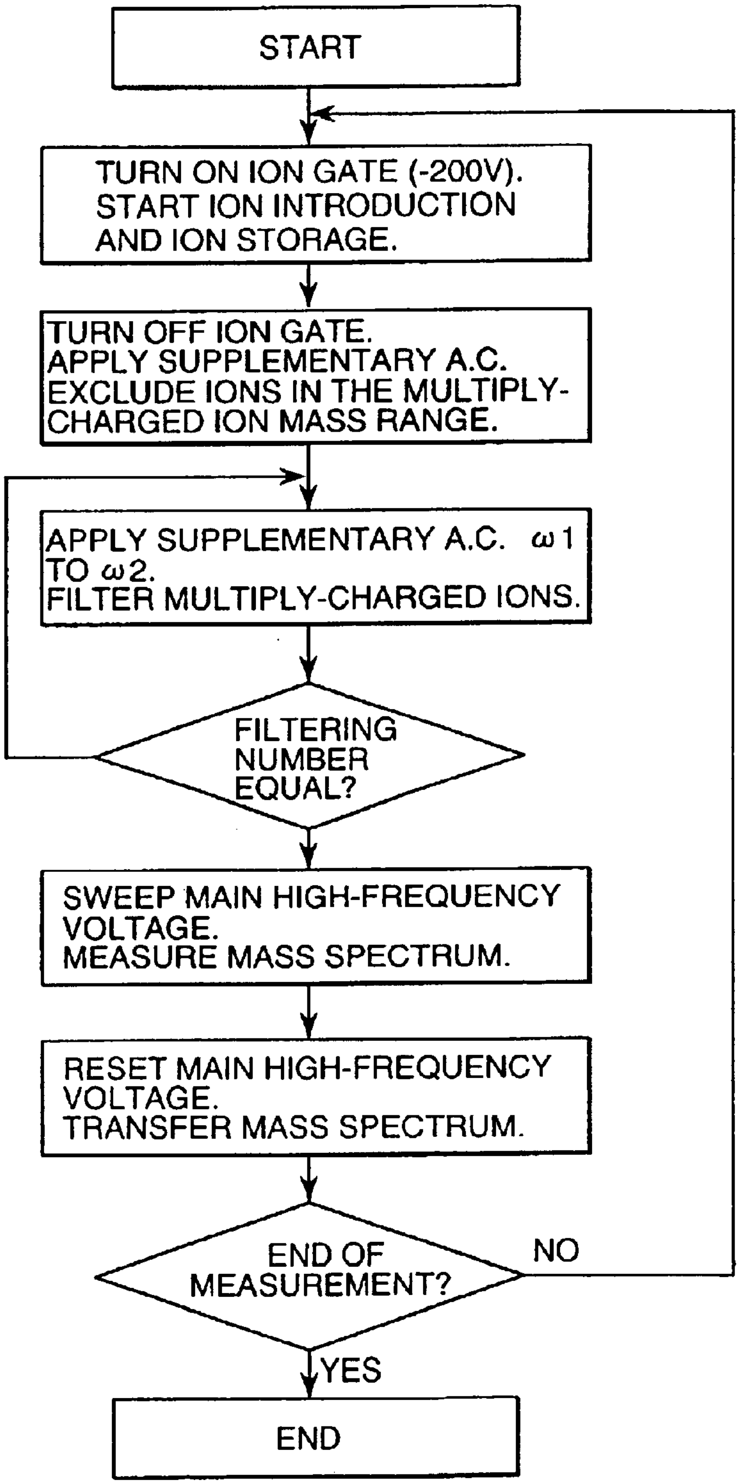
FIG. 13 is an operating flow chart of the first embodiment.

When the main high-frequency voltage is swept until the predetermined masses are obtained, the main high frequency voltage is reset to zero and all ions remaining in the ion trap are ejected. Then, the second scanning starts. Control is returned to the Ionization step (1) and the ionization or ion introduction starts. In this way, the embodiment repeats the measurement and obtains a mass spectrum. FIG. 13 shows the processing sequence of the embodiment.

As for the ion trap type mass spectrometer, the multiply-charged ion filtering step (3) can be repeated after step (1) to (3).

Steps (4) and (5) follow after the filtering step (3) is repeated by a predetermined number of times. This repetition number is determined according to the signal ratio of chemical noises to multiply-charged ions.

(Embodiment 2)

Figure 14:
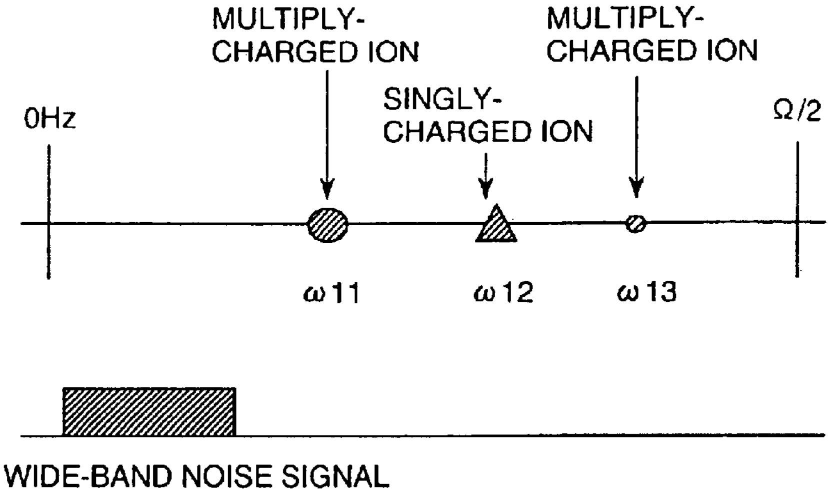
FIG. 14 is an operating diagram of the second embodiment.
Figure 15:
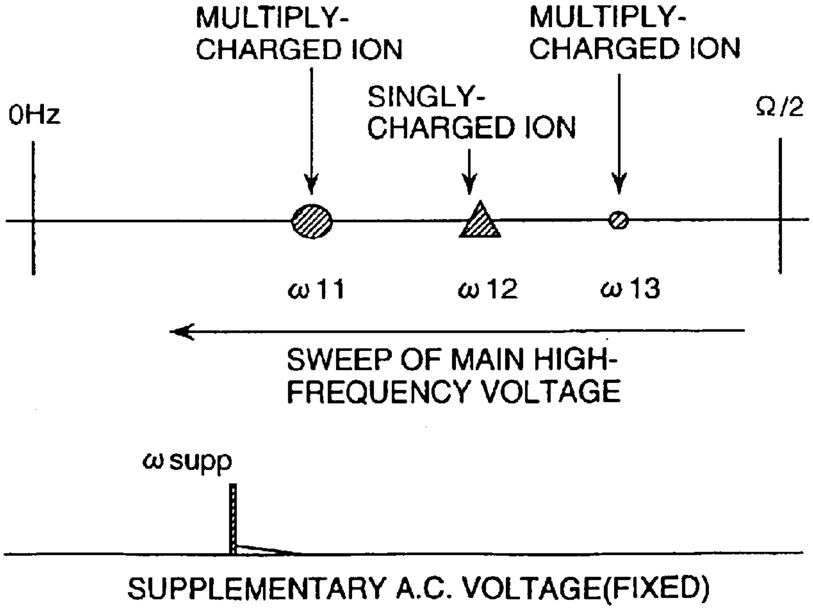
FIG. 15 is an operating diagram of the first embodiment.
Figure 16:
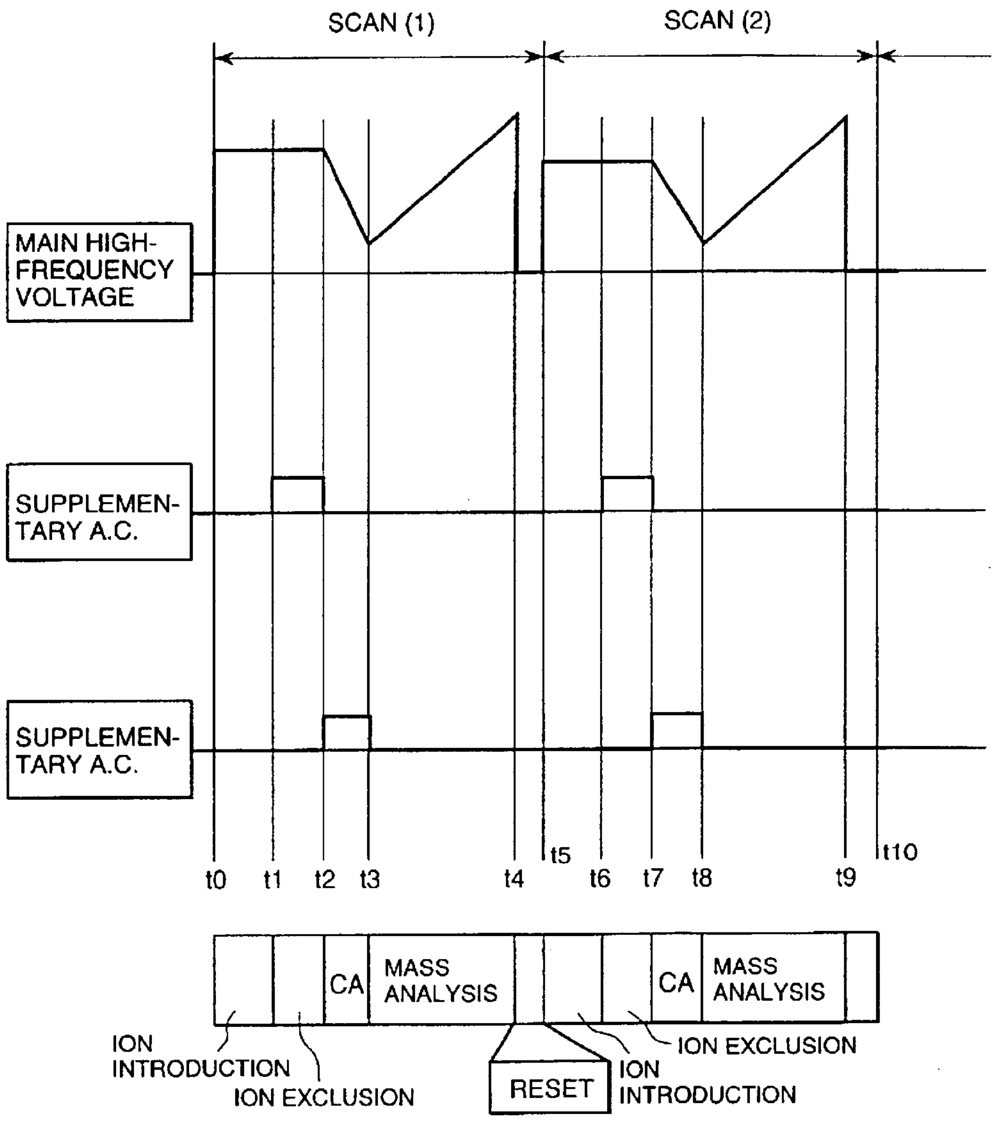
FIG. 16 is a timing diagram illustrating the operation of the first embodiment.

The second embodiment is illustrated in FIG. 14 through FIG. 16.

As explained above, the first embodiment frequency-sweeps the supplementary AC voltage without changing the main high-frequency voltage for the multiply-charged ion filtering.

The second embodiment sweeps the amplitude (voltage) of the main high frequency voltage without changing the supplementary AC voltage. The second embodiment comprises the following steps:

(1) Producing ions outside the ion trap volume and introducing the ions into the ion trap volume 25 or producing ions in the ion trap volume (2) Excluding ions of a high mass range from the ion trap volume For this purpose, a wide-band noise signal of above 3 to 10V is applied between the end cap electrodes. All ions having the secular frequencies corresponding to the frequencies of this wide band noise are excluded from the ion trap volume (see FIG. 14).

(3) Applying a supplementary AC voltage selected from FIG. 2 to FIG. 5 (see FIG. 15)

(4) Starting sweeping the main high frequency voltage from high voltage to low voltage (5) Stopping sweeping when the main high frequency voltage reaches a preset voltage (6) Repeating the steps (4) and (5) if necessary (7) Sweeping the main high frequency voltage and collecting mass spectrum In step (4), a multiply-charged ion filtering is carried out as shown in FIG. 15. A supplementary AC voltage comprising a plurality of frequency components and a voltage is applied between the end cap electrodes. Sweeping of the main high frequency voltage starts from high voltage to low voltage. As the main high frequency voltage goes lower, the secular frequency ω11 of the multiply-charged ions of "n" charges gradually goes lower and finally reaches the frequency ω2 of the supplementary AC voltage. The multiply-charged ions of "n" charges are excited and undergo the proton extraction reaction. The multiply-charged ions of "n−1" charges which are extracted protons by the proton extraction reaction jumps to the high mass region over the main high frequency voltage region (ω1 to ω2). During this period, sweeping of the supplementary AC voltage continues and the secular frequency ω11 keeps on going down.

The excitation in resonance continues until the secular frequency ω11 reaches ω1 of the supplementary AC voltage. The ions which are neither extracted protons nor dissociated are excluded from the ion trap volume by resonance of ω1. In other words, only proton-extracted ions among multiply-charged ions jump into the high mass region (left side of the supplementary AC voltage region) over the supplementary AC voltage region (ω1 to ω2) and are trapped in the ion trap. Singly-charged ions are driven out of the ion trap by the supplementary AC voltage.

FIG. 16 shows a timing diagram illustrating the operation of the second embodiment.

(1) Time t0 to t1

Applying a preset main high frequency voltage, introducing ions into the ion trap volume, and trapping ions in the ion trap volume (2) Time t1 to t2

Applying a supplementary AC voltage of a wide band noise between end cap electrodes and excluding high mass ions from the ion trap volume (3) Time t2 to t3

Applying a supplementary AC voltage having multiple frequency components of different voltages and starting sweeping the main high frequency voltage towards the low voltage (4) Time t3 to t4

Stopping sweeping of the main high frequency voltage, starting sweeping the main high frequency voltage towards the high voltage, and obtaining mass spectrum (5) Time t4 to t5

Resetting the main high frequency voltage and ending collection of mass spectra

The second embodiment as well as Embodiment 1 can repeat Step (3) to increase the efficiency in filtering the multiply-charged ions.

Figure 17:
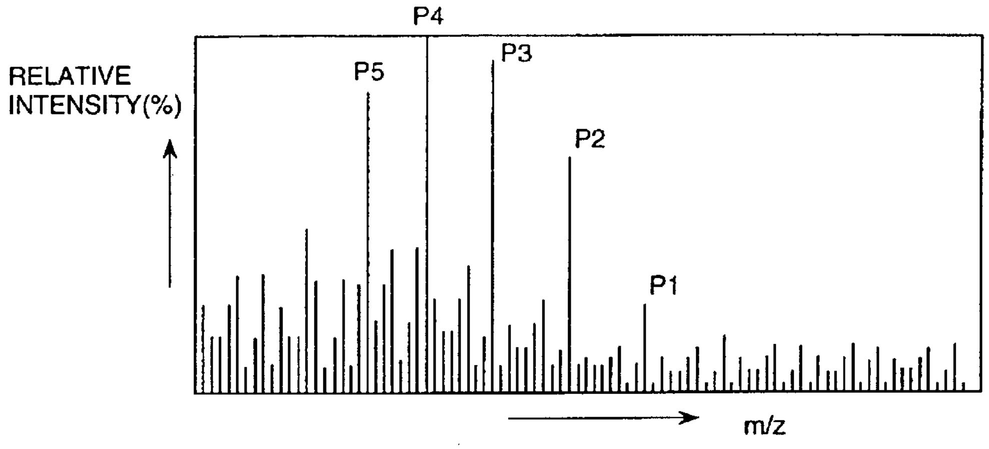
FIG. 17 is a mass spectrum obtained by a method which is not in accordance with the present invention.
Figure 18:
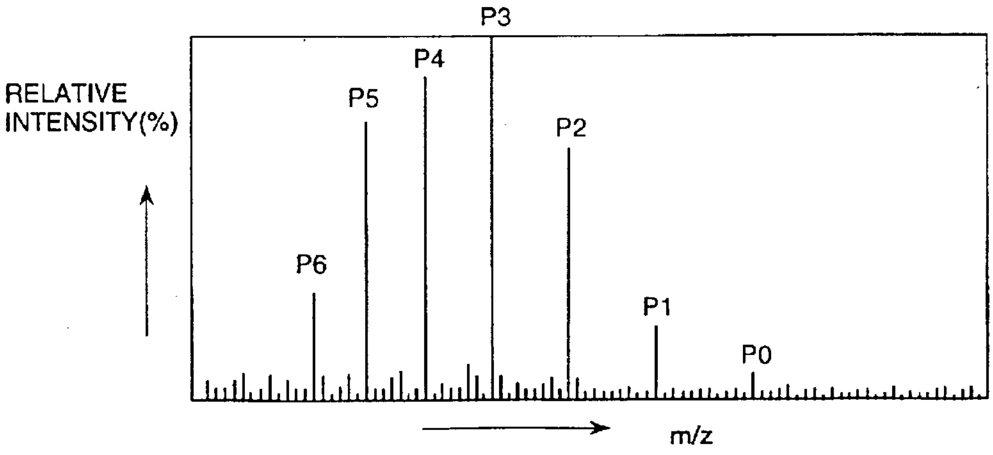
FIG. 18 is one mass spectrum example obtained by a method which is in accordance with the present invention.
Figure 19:
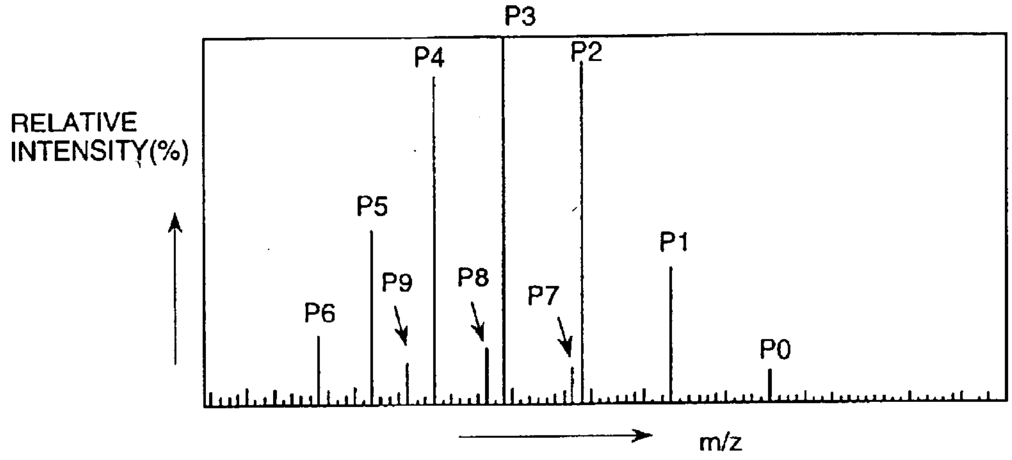
FIG. 19 is another mass spectrum example obtained by a method which is in accordance with the present invention.

FIG. 17 to FIG. 19 shows improved mass spectrum examples obtained by Embodiments 1 and 2.

FIG. 17 shows a mass spectrum of a protein extracted a biological tissue. This mass spectrum has the mass-to-charge ratio (m/z) on the x-axis and the relative intensity (maximum peak at 100%) on the y-axis. Even when a sample has been fully preprocessed or cleaned up, its mass spectrum contains a lot of impurity peaks. Mass peaks P1 to P5 are multiply-charged ions coming from the sample protein. The other mass peaks over the wide mass range are all coming from impurities. They are mass peaks of low-mass ions and adduct ions. Particularly, in the low mass region (where the m/z value is less than 1,000), impurity peaks occupy more than the signal peaks. These impurity peaks make mass-analysis of the sample difficult. Particularly, components of extremely small amounts are lost in chemical noises.

FIG. 18 shows a mass spectrum obtained after implementation of multiply-charged ion filtering of this invention once. As seen from this figure, most chemical noises in this spectrum are 1/10 or below (in the relative intensity) of those in the spectrum for which the multiply-charged ion filtering is not implemented. Although the mass peaks of the multiply-charged ions are shifted right (towards less charges), the whole appearance of mass peaks is approximately the same. As the chemical noises are dramatically reduced, the multiply-charged ions become visible more clearly. Further, the multiply-charged ion peak $P_0$ which is buried in chemical noises becomes visible clearly on the spectrum.

FIG. 19 shows a mass spectrum obtained after implementation of multiply-charged ion filtering of this invention twice. The chemical noises in this spectrum become much smaller than those in the spectrum of FIG. 18. This spectrum clearly shows not only the mass peaks P0 to P6 of multiply-charged ions coming from the sample protein but also mass peaks P7 to P9 of multiply-charged ions coming from the other protein which is contained in the sample solution (Embodiment 3)

Figure 20:
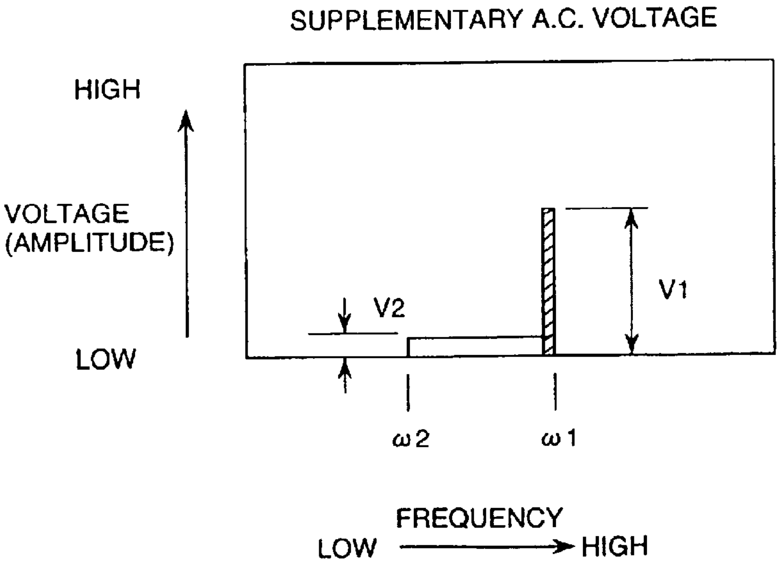
FIG. 20 is a supplementary AC voltage which is an embodiment of the present invention.
Figure 21:
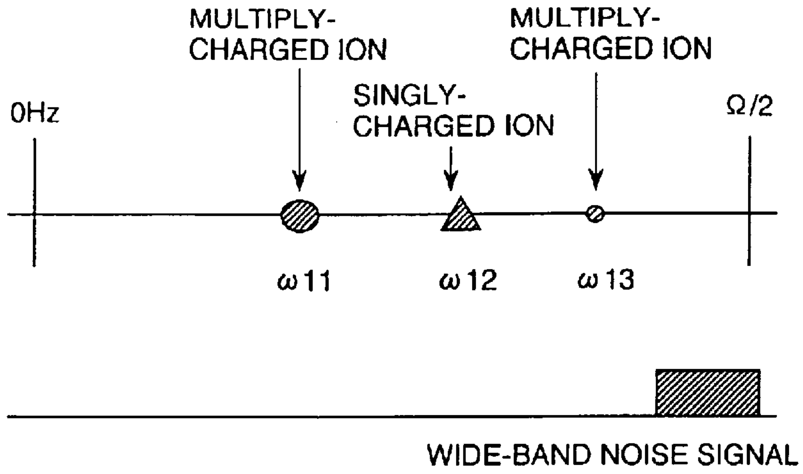
FIG. 21 is an operating diagram of the third embodiment.
Figure 22:
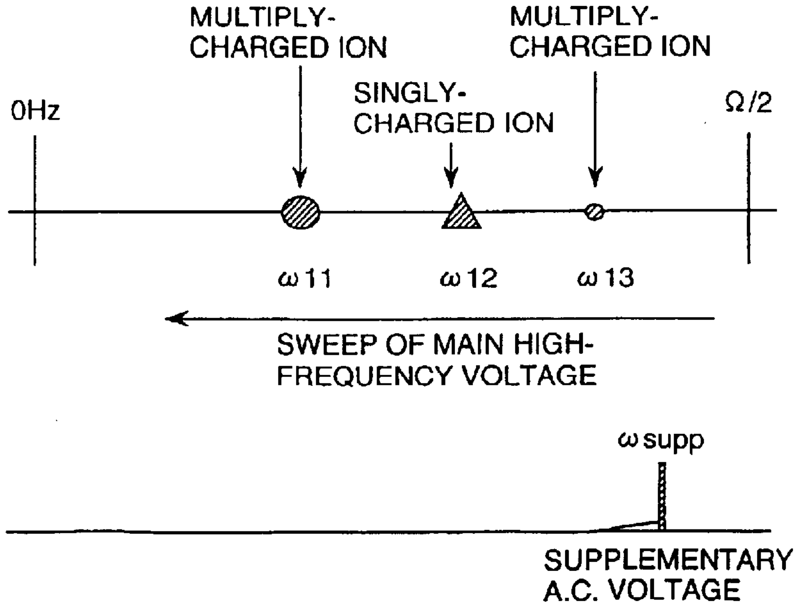
FIG. 22 is an operating diagram of the third embodiment.

The third embodiment is illustrated in FIG. 20 through FIG. 22.

As explained above, the first embodiment described the multiply-charged ion filtering comprising the steps of frequency-sweeping the supplementary AC voltage without changing the main high-frequency voltage, exciting ions sequentially in the order of higher mass ions to lower mass ions, and trapping multiply-charged ions selectively in the ion trap by the ion-molecule reaction.

The second embodiment described the multiply-charged ion filtering comprising the steps of sweeping the main high frequency voltage without changing the supplementary AC voltage, exciting ions sequentially in the order of higher mass ions to lower mass ions, and trapping multiply-charged ions selectively in the ion trap by the ion-molecule reaction.

The third embodiment explains a method of applying a supplementary AC voltage unlike Embodiments 1 and 2.

FIG. 20 shows the power spectrogram of the supplementary AC voltage used by the present invention which is a mirror image of FIG. 2. The supplementary AC voltage comprises a plurality of high frequency components. The wide-band noise signal contains frequency components ω2 to ω1 of voltage V2 and a frequency component ω1 of voltage V1. Here, ω1 is higher than ω2 and V2 is much smaller than V1. In general, voltage V2 is about 0.2V and voltage V1 is about 3V.

This embodiment describes a method of sweeping the supplementary AC voltage for higher frequency to low frequency without changing the main high frequency voltage.

(1) Producing ions outside the ion trap volume and introducing the ions into the ion trap volume 25 or producing ions in the ion trap volume (2) Excluding ions of a low mass range from the ion trap volume For this purpose, a wide-band noise signal of above 3 to 10V is applied between the end cap electrodes (see FIG. 21).

All ions having the secular frequencies corresponding to the frequencies of this wide band noise are excluded from the ion trap volume.

Figure 5:
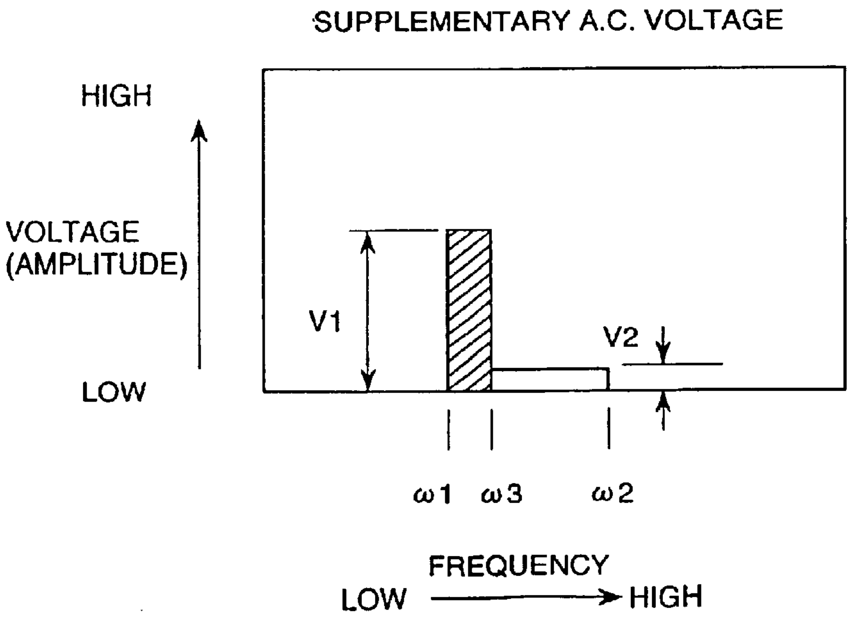
FIG. 5 is an embodiment of a supplementary AC voltage of the present invention.

(3) Applying a supplementary AC voltage of FIG. 20 of a frequency corresponding to that of the low-mass region The supplementary AC voltage to be applied can be a mirror image of FIG. 3 to FIG. 5.

Figure 23:
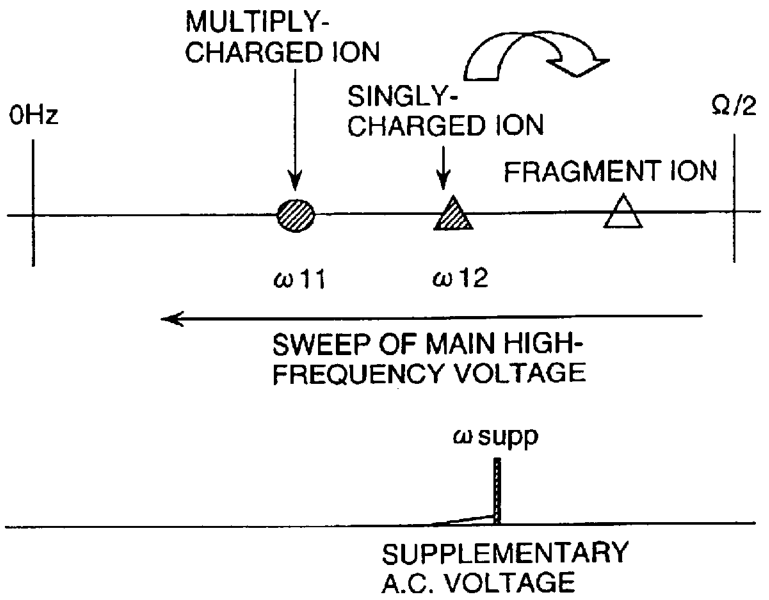
FIG. 23 is an operating diagram of the third embodiment.

(4) Starting sweeping the main high frequency voltage from high voltage to low voltage while keeping the form of the supplementary AC voltage (5) Stopping sweeping when the frequency of the supplementary AC voltage reaches a preset voltage (6) Repeating the steps (4) and (5) if necessary (7) Sweeping the main high frequency voltage and collecting mass spectrum In Step (4), the multiply-charged ions which are deprived of protons increase the m/z value and jump leftward along the q-axis. The singly-charged ions produce daughter ions (fragment ions) of lower masses by collision induced dissociation in resonance with the supplementary AC voltage. As the m/z value of a daughter ion is smaller than that of the parent ion, the daughter ion jumps into the low-mass region over the supplementary AC voltage region (see FIG. 23). The ions which are neither deprived of protons nor dissociated into daughter ions are strongly excited by ω1 of the supplementary AC voltage and driven out of the ion trap. In other words, the third embodiment unlike Embodiments 1 and 2 traps daughter ions selectively in the ion trap volume and positively excludes singly-charged ions and multiply-charged ions out of the ion trap volume. This method screens the daughter ions.

Embodiment 3 sweeps the frequency of the supplementary AC voltage without changing the main high frequency voltage, but Embodiment 3 can sweep the main high frequency voltage without changing the supplementary AC voltage.

In this case, the main high frequency voltage is swept from low voltage to high voltage. The ions are weakly excited sequentially in the order of low-mass ions to high-mass ions and undergo the ion-molecule reaction and the dissociation. The ions which are neither deprived of protons nor dissociated are excluded from the ion trap volume by a subsequent strong resonance. Finally, the dissociated daughter ions are selectively trapped in the ion trap. The mass spectrum of the daughter ions can be obtained by any conventional method.

The above embodiments of the present invention have used positive ions for explanation but the present invention is not limited to the positive ions. The present invention can also be applied to negative ions. For example, as DNAs produce negative multiply-charged ions, the negative ion mode of the present invention can be applied to DNAs. In this case, the negative multiply-charged ion deprives a polar molecule such as water of a proton and lose one negative charge.

Further, the present invention is not limited to the electrospray ionization (ESI) as the ionization method but can be applied to the other ionization method such as sonic spray ionization (SSI). Further, this invention is not limited to supply of ions from outside the ion trap. Ions can be produced inside the ion trap volume.

In the above description of each embodiment, there is provided an example of proton deprival reaction made by an ion-molecule reaction of multiply-charged ions and neutral molecules (e.g., residual gas (water), water introduced from the LC, and methanol molecules) in the ion trap volume. In addition to this, it is possible to introduce amines (ammonia, alkyl amines, so on) as positive multiply-charged ions or acids (trifluoro acetate, formic acid, etc.) as negative multiply-charged ions directly into the ion trap volume. The introduction of them substances will further assure the proton extraction reaction.

As already explained above, the present invention can reduce chemical noises selectively by the use of an ion trap type mass spectrometer. As the result, the present invention can achieve high sensitivity and high reliability mass-analyses of biological substances such as traces of proteins, peptides, and DNAs.

What is claimed is:

1. An ion trap mass spectrometer comprising a mass analyzing unit having a ring electrode and one pair of end cap electrodes;

a detecting unit for detecting ions ejected from said mass analyzing unit; and a control unit for controlling a voltage applied to said mass analyzing unit, wherein said control unit applies a main high frequency voltage to said ring electrode, forms a three-dimensional quadrupole field, and applies a supplementary AC voltage having a plurality of AC voltage components having different frequencies between said ring electrode and said end cap electrodes while ions are trapped in said mass analyzing unit, and wherein said supplementary AC voltage has a predetermined frequency band (ω1 to ω2) and components of said band are swept together, wherein the voltage (V1) of at least one frequency component of said supplementary AC voltage is at least high enough to eject ions in resonance, and wherein the voltage (V2) of at least another frequency component of said supplementary AC voltage is high enough to excite ions in resonance but not high enough to eject ions in resonance.

2. An ion trap mass spectrometer in accordance with claim 1, wherein said voltage V2 is higher at a frequency component of said voltage V1 than at a frequency more remote from the frequency component of said voltage V1.

3. An ion trap mass spectrometer in accordance with claim 1, wherein the frequency component having said voltage V2 is discontinuous.

4. An ion trap mass spectrometer comprising:

a mass analyzing unit forming an ion trap volume with a ring electrode and one pair of end cap electrodes;

a detecting unit for detecting ions ejected from said mass analyzing unit; and a control unit for controlling a voltage applied to said mass analyzing unit, wherein, among ions trapped in said ion trap volume, singly-charged ions are selectively ejected out of the ion trap volume, and multiply-charged ions are left in said ion trap volume.

5. An ion trap mass spectrometer in accordance with claim 4, wherein a supplementary AC voltage comprising a frequency component having a plurality of voltage values is applied to said end cap electrodes and is scanned with respect to either the voltage value, or the frequency value, or both, wherein said supplementary AC voltage has a predetermined frequency band (ω1 to ω2 and components of said band are swept together, wherein the voltage (V1) of at least one frequency component of said supplementary AC voltage is at least high enough to eject ions in resonance, and wherein the voltage (V2) of at least another frequency component of said supplementary AC voltage is high enough to excite ions in resonance but not high enough to eject ions in resonance.

* * * * *